United States Patent [19]
Takagi et al.

[11] Patent Number: 5,235,636
[45] Date of Patent: Aug. 10, 1993

[54] PORTABLE TELEPHONE SET HOUSING HAVING AN ILLUMINATED SWITCH PANEL

[75] Inventors: Hisamitsu Takagi, Inagi; Masashi Tomura, Tokyo, both of Japan

[73] Assignee: Fujitsu Limited, Kawasaki, Japan

[21] Appl. No.: 741,569

[22] Filed: Aug. 7, 1991

[30] Foreign Application Priority Data

| Aug. 7, 1990 [JP] | Japan | 2-207598 |
| Sep. 7, 1990 [JP] | Japan | 2-235661 |
| Sep. 7, 1990 [JP] | Japan | 2-235664 |

[51] Int. Cl.$^5$ .................................................. H04M 1/00
[52] U.S. Cl. ..................................... 379/368; 379/422; 379/429
[58] Field of Search ............... 340/825.44; 379/56, 379/58, 376, 368, 369, 370, 428, 429, 422; 362/88

[56] References Cited

U.S. PATENT DOCUMENTS

| 4,845,748 | 7/1989 | Boharron | 379/368 |
| 4,873,519 | 10/1989 | Matai et al. | 340/825.44 |
| 4,982,424 | 1/1991 | Saito et al. | 379/376 |
| 5,130,629 | 7/1992 | Kuhfus | 379/429 |
| 5,166,868 | 11/1992 | Starton et al. | 361/422 |

*Primary Examiner*—Curtis Kuntz
*Assistant Examiner*—William Cumming
*Attorney, Agent, or Firm*—Staas & Halsey

[57] ABSTRACT

A portable telephone set housing having an illuminated switch portion. A flexible printed circuit board having a membrane switch and a liquid crystal display is mounted onto a support base of the telephone set housing. Onto the flexible printed circuit board is placed a key top sheet having a plurality of key tops. A switch panel having a plurality of holes for inserting therein of the key tops is mounted onto the key top sheet. The switch panel includes a transparent resin plate having an ink coating formed on the surface thereof except for a portion corresponding to the position of the display portion. In the membrane switch portion of the flexible printed circuit board, a plurality of light emitting diodes are provided which are adapted to introduce light into the interior of the switch panel.

7 Claims, 7 Drawing Sheets

PORTABLE TELEPHONE SET HOUSING HAVING AN ILLUMINATED SWITCH PANEL

FIELD OF THE INVENTION

The present invention relates generally to a portable telephone set housing and particularly to a portable telephone set housing having an illuminating function to permit the use thereof during the night. The term "portable telephone set housing" as used herein includes general cordless telephone set housing.

BACKGROUND OF THE INVENTION

An ultimate object of communication is to transmit or exchange information immediately to anyone any time from anywhere. In addition to the conventional fixed point-to-point communication, a mobile communication has been being developed gradually. Mobile communication is a communication between a moving body (including man) such as ship, automobile or aircraft and a general subscriber's station or an office and it is also a communication between moving bodies. Recently, portable telephones and cordless telephones which are mobile communication devices have been developed actively.

The reduction in size of a portable telephone is important in its use. Since a portable telephone set is used while holding the receiver to the ear, it is necessary to give consideration from a human engineering stand. This is an obstacle to the reduction in size of a portable telephone set. Therefore, it has been desired to attain the reduction of size while giving consideration from a human engineering stand. Further, since a portable telephone set is often used at a place where there is no illumination during the night, it is absolutely necessary to provide a structure having an illuminating function using back light.

In conventional portable telephone sets, a light guide plate for back light is provided separately from the case to attain an illuminating function during the night, and a switch portion is constituted by a silicone rubber switch. Since the switch portion is formed using silicone rubber, there has been the problem that the reduction in size of a portable telephone set is not attained to a satisfactory extent.

To meet the demand for the reduction of both size and weight, it is necessary to use a thin-walled telephone set, and in the interior of the case there are accommodated electronic parts which have been packaged in high density. Since in a portable telephone set there is utilized a high frequency band of 800 to 900 MHz or so called a quasi-microwave band, it is necessary to strengthen the electromagnetic shield in the interior of the case while attaining a reduction in weight of the case, thereby preventing various troubles caused by electromagnetic interference.

According to the prior art, a metallic film is formed on the inner surface of a resin molded case by, for example, plating, electrostatic coating, or vapor deposition of aluminum, and a high frequency function circuit is received therein and electromagnetic shield is performed. However, with the reduction in size and weight of portable telephone sets, it has become necessary to adopt a three-dimensional circuit configuration wherein parts are packaged to a molded case itself, and with the conventional electromagnetic shield structure it has become impossible to cope with such necessity.

SUMMARY OF THE INVENTION

Accordingly it is an object of the present invention to provide a portable telephone set housing capable of illuminating a switch portion and which is reduced in size.

It is another object of the present invention to provide a simple shield structure for a portable telephone set capable of electromagnetically shielding the interior of a case which incorporates a high frequency function circuit therein.

In accordance with an aspect of the present invention, there is provided a portable telephone set housing comprising a case having a support base; a flexible printed circuit board mounted on the support base of the case and having a membrane switch portion and a display portion; a key top sheet placed on the flexible printed circuit board and having a plurality of convex key tops; a switch panel mounted on the key top sheet and having a plurality of holes into which are inserted the convex key tops, the switch panel being formed by a transparent resin plate and with an ink coating being formed on the surface of the switch panel except the portion corresponding to the display portion, the switch panel being adapted to function as a light guide plate; and a plurality of light sources adapted to introduce light into the interior of the switch panel.

In accordance with another aspect of the present invention, there is provided a portable telephone set housing comprising a case which includes a support base having a plurality of holes, with a metallic film being formed on an inner surface of the case; a flexible printed circuit board mounted on the support base of the case and having a membrane switch portion and a display portion, the flexible printed circuit board further having a plurality of holes in positions corresponding to positions of the holes of the case; a key top sheet placed on the flexible printed circuit board and having a plurality of convex key tops, the key top sheet having a plurality of holes in positions corresponding to positions of the holes of the case, and a switch panel including a plurality of openings into which are inserted the convex key tops, a plurality of partition walls for partitioning the said openings by groups, a plurality of projections formed respectively on the said partition walls in position corresponding to positions of the holes of the case, and a metallic film formed on end faces of the partition walls and side faces of the projections, the switch panel being mounted to the case from above the key top sheet so that the said projections are inserted into the holes of the case through the holes formed in the key top sheet and the holes formed in the flexible printed circuit board.

Preferably, a plurality of switch disks are provided in the membrane switch portion of the flexible printed circuit board, and an actuator is fixed to the lower end of each convex key top of the key top sheet. The front end of the actuator is in abutment with the corresponding switch disk.

The above and other objects, features and advantages of the present invention and the manner of realizing them will become more apparent, and the invention itself will best be understood from a study of the following description and appended claims with reference to the attached drawings showing preferred embodiments of the invention.

DESCRIPTION OF THE PREFERRED EMBODIMENTS

Figure 1:
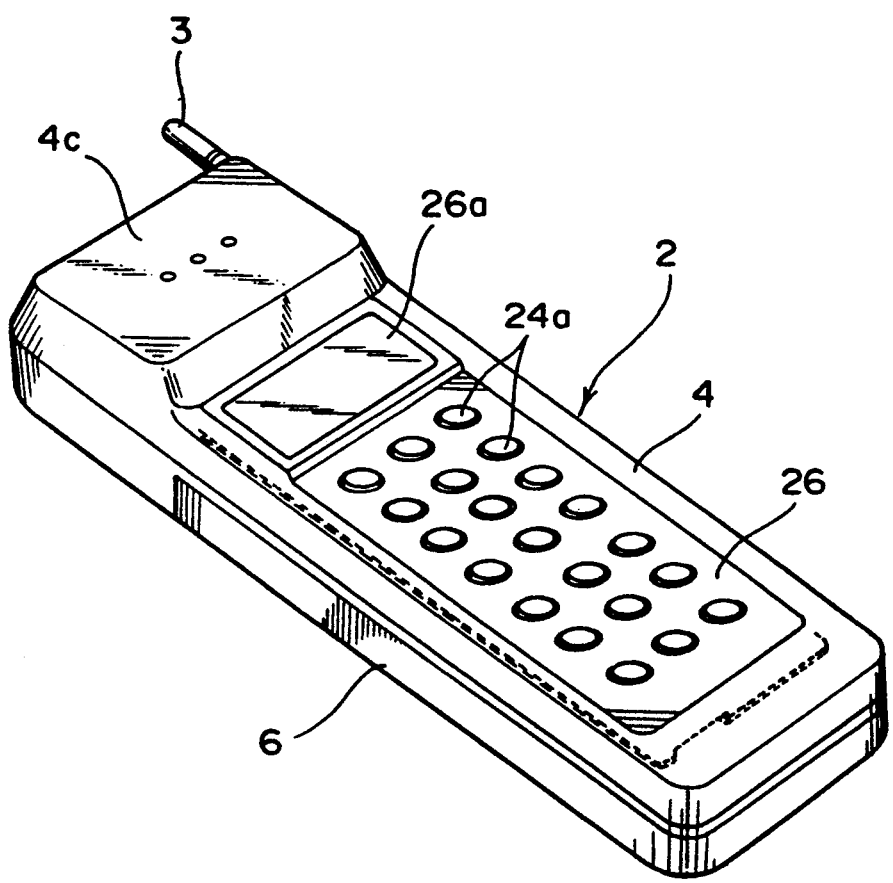
FIG. 1 is a perspective view of a portable telephone set housing according to an embodiment of the present invention.
Figure 2:
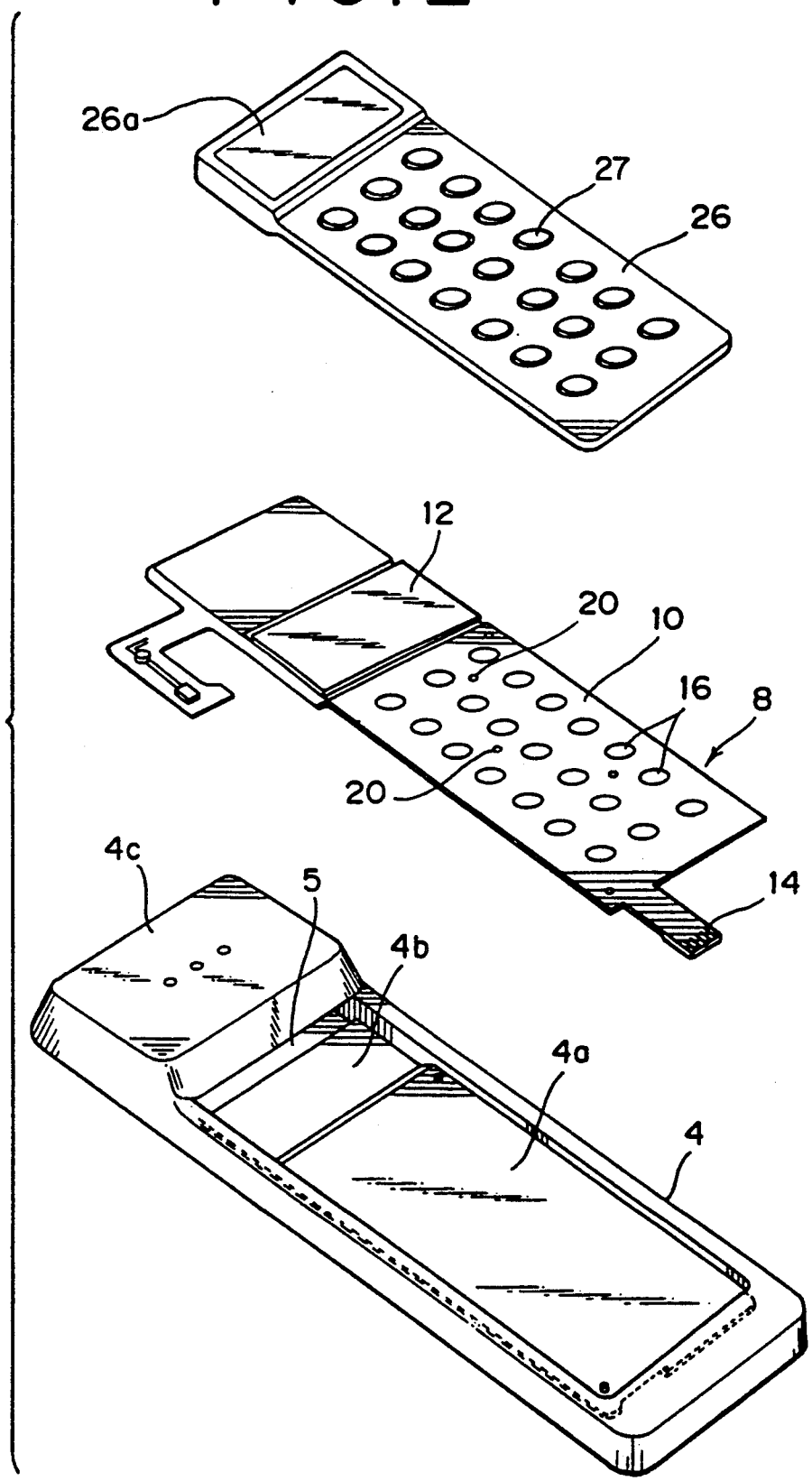
FIG. 2 is an exploded perspective view of the portable telephone set housing shown in FIG. 1, with a rear case omitted.
Figure 3:
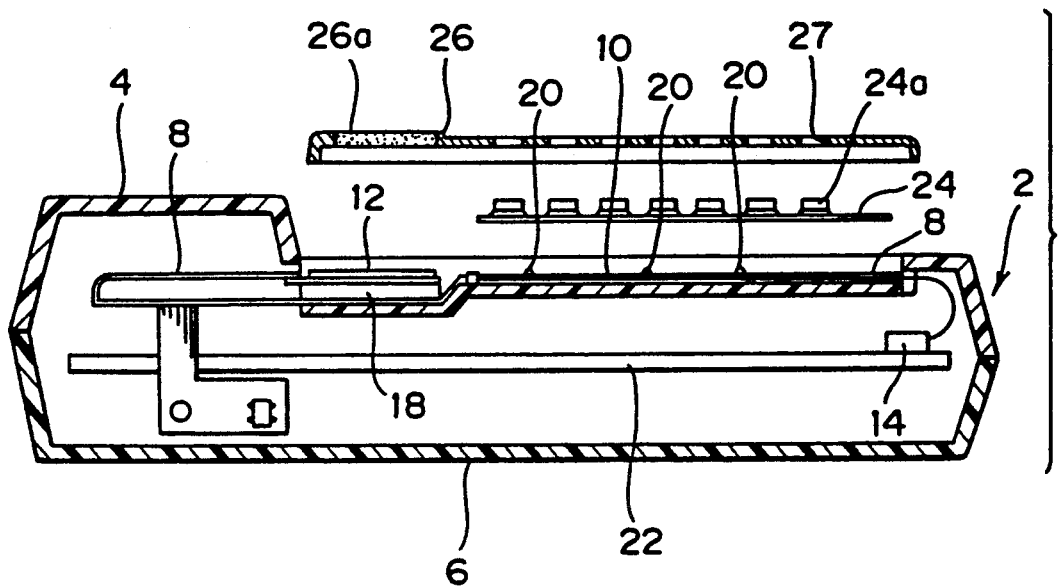
FIG. 3 is an exploded sectional view of the portable telephone set housing shown in FIG. 1.

Referring to FIGS. 1 to 3, a case 2 of a portable telephone set housing is composed of a front case 4 and a rear case 6. An antenna 3 is mounted to a side face of the case 2 so that it can be pulled out. The front case 4 is provided with a support base 4a for a flexible printed circuit board 8, a support base 4b for a liquid crystal display (LCD) 12, and a receiver portion 4c which incorporates an earpiece therein. Between the support base 4b for the LCD 12 and the receiver portion 4c there is formed a slit 5 for insertion therein of the flexible printed circuit board 8.

The flexible printed circuit board 8 is formed from a polyester film or a polyimide film, and the membrane switch portion 10 is provided with a plurality of switch disks 16 formed of phosphor bronze or stainless steel. The flexible printed circuit board 8 carries the LCD 12 thereon, and under the LCD 12 there is provided an LED panel 18 for back light.

The membrane switch portion 10 of the flexible printed circuit board 8 is provided with a plurality of LED's 20 for illumination. Electroluminescence (EL) may be employed in place of LED's. A connector 14 of the flexible printed circuit board 8 is connected to a printed circuit board 22 mounted within the case 2. On the upper side of the printed circuit board 22 there are mounted logic circuit parts (not shown), while on the lower side thereof are mounted electronic parts which constitutes the transmitter and receiver (not shown).

Figure 4:
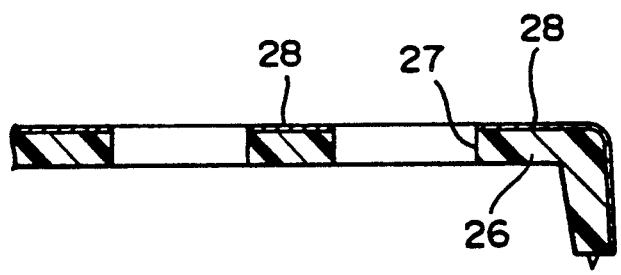
FIG. 4 is an enlarged sectional view of a switch panel.

On the flexible printed circuit board 8 is mounted a key top sheet 24 having a plurality of convex key tops 24a formed thereon in positions corresponding to the switch disks 16. The reference numeral 26 denotes a switch panel. The switch panel 26 is formed by a transparent resin plate having a plurality of holes 27 into which are inserted the convex key tops 24a of the key top sheet 24. On the surface of the transparent resin plate there is formed an ink coating 28 as shown in FIG. 4 except for a portion 26a corresponding to the LCD 12. It is desirable that the ink coating 28 be formed during molding by an in-mold method (a film transfer molding method). The convex key tops 24a of the key top sheet 24 are inserted into the holes 27 of the switch panel 26, which in turn is mounted to the front case 4 by ultrasonic welding for example.

Figure 5:
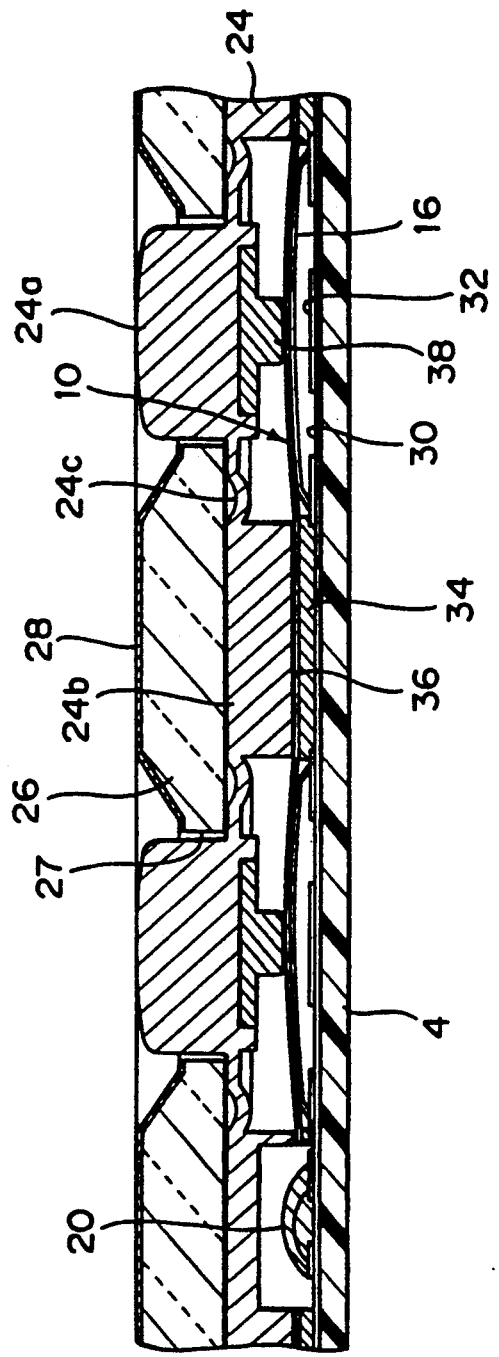
FIG. 5 is an enlarged sectional view of a switch portion.

A detailed structure of the switch portion will now be described with reference to FIG. 5. A polyester film 30 is bonded to the front case 4, and metallic contacts 32 are provided in positions corresponding to the switch disks 16. Another polyester film 36 covers the switch disks 16 from above, and between adjacent switch disks 16 there is provided a spacer 34. In this way there is constituted a membrane switch portion 10.

The key top sheet 24 is formed by connecting the convex key tops 24a and contact support portions 24b through skirt portions 24c. The convex key tops 24a are inserted into the holes 27 of the switch panel 26 formed of a transparent resin. On the upper surface of the switch panel 26 is formed the ink coating 28 by an in-mold method for example, as mentioned above. An actuator 38 is mounted to the lower end of each convex key top 24a of the key top sheet 24, and a bottom end thereof is in abutment with the associated switch disk 16.

When a convex key top 24a is depressed, the associated skirt portions 24c bend and the actuator 38 pushes down the switch disk 16, resulting in the switch disk 16 coming into abutment with the contact 32 and to turn the switch on. Upon release of the pushing force for the convex key top 24a, the switch disk 16 reverts to its original state by virtue of its resilient force, so that the switch turns off.

On the membrane switch portion 10 are mounted a plurality of LED's 20, and light radiated from the LED's 20 is passed through the key top sheet 24 which is translucent and is introduced into the switch panel 26 formed of a transparent resin. The light thus introduced into the switch panel 26 is reflected by the upper and lower surfaces of the switch panel and spreads laterally mainly through the interior of the switch panel, so that the plural convex key tops 24a are illuminated. Attenuation of the light from the LED's 20 can be kept to a minimum by forming a thin film of white color between the switch panel 26 and the ink coating 28 or on the switch panel 26 side of the polyester film 36.

In the portable telephone set of this embodiment, since the switch panel 26 is formed of a transparent resin, the switch panel can function as a light guide plate. When the portable telephone set is used at a place where there is no lighting, by lighting the LED's 20 for illumination, the light from the diodes can be conducted through the switch panel 26 to illuminate the convex key tops 24a. Thus, the switching operation can be effected easily even during darkness.

Though not shown, by forming gouged letters in the ink coating 28, the indication represented by such gouged letters can be recognized easily when there is no external lighting during the night for example.

Although in the above embodiment the LED's 20 for illumination are provided on the flexible printed circuit board 8, the LED's for illumination may be mounted on the surface of the printed circuit board 22. In this case, it is necessary that the front case 4 portion corresponding to the membrane switch portion 10 and LCD 12 be made transparent, and it is possible to omit the LED panel 18.

Figure 6:
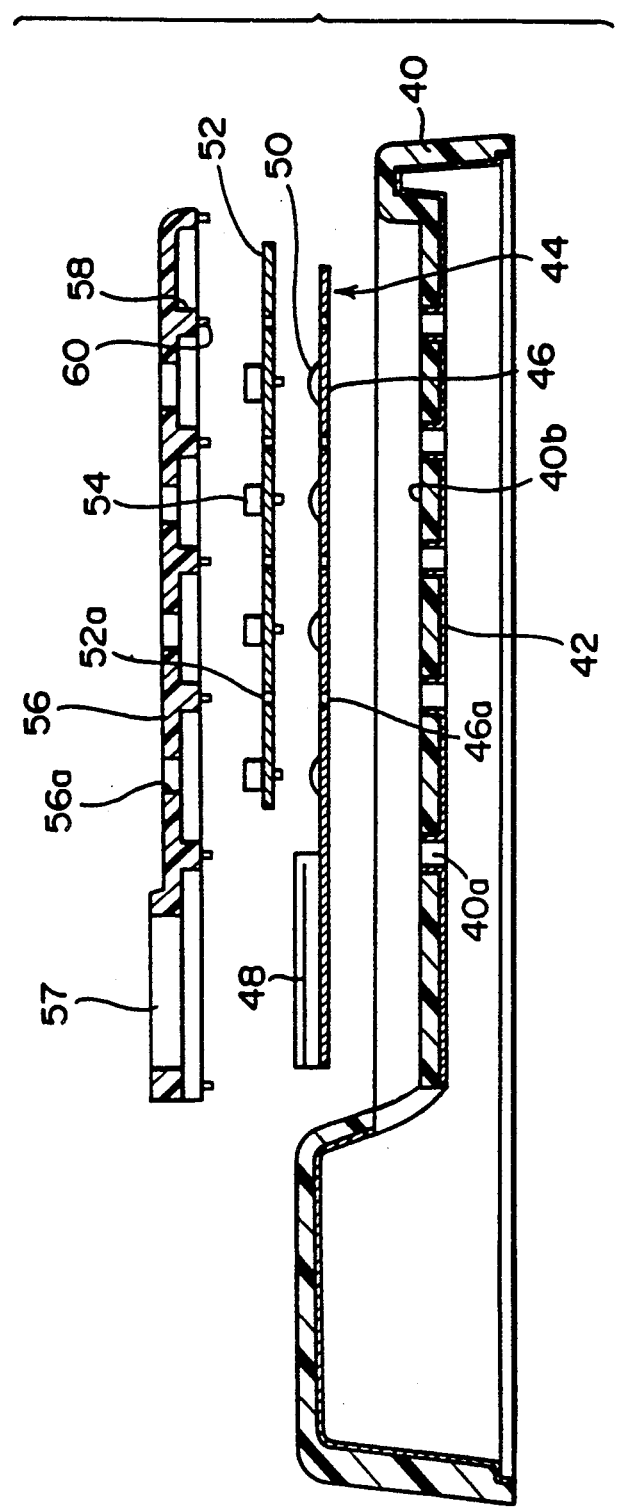
FIG. 6 is an exploded sectional view of a portable telephone set housing according to another embodiment of the present inventions.

Now, the construction of another embodiment of the present invention will be described with reference to FIGS. 6 to 9. Referring first to FIG. 6, a plurality of holes 40a are formed in a support base 40b of a resin molded case 40 of a portable telephone set housing embodying the invention. On an inner surface of the case 40 is formed a vapor-deposited aluminum film 42. A flexible printed circuit board 44 is mounted on the support base 40b of the case 40. The flexible printed circuit board 44 is formed by a polyester film or a polyimide film, and a plurality of switch disks 50 formed of phosphor bronze or stainless steel are provided on a membrane switch portion 46 of the flexible printed circuit board 44. Also, a plurality of holes 46a are formed in the membrane switch portion 46 in positions corresponding to the holes 40a of the case 40. Further, an LCD 48 is mounted on the flexible printed circuit board 44.

The reference numeral 52 denotes a key top sheet. The key sheet 52 is provided with a plurality of holes 52a in positions corresponding to the holes 40a of the case 40 and also is provided with a plurality of convex key tops 54 in positions corresponding relation to the switch disks 50.

Figure 7:
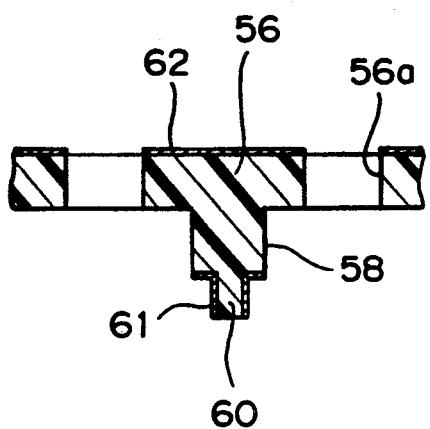
FIG. 7 is an enlarged sectional view of a projecting portion in the embodiment illustrated in FIG. 6.
Figure 8:
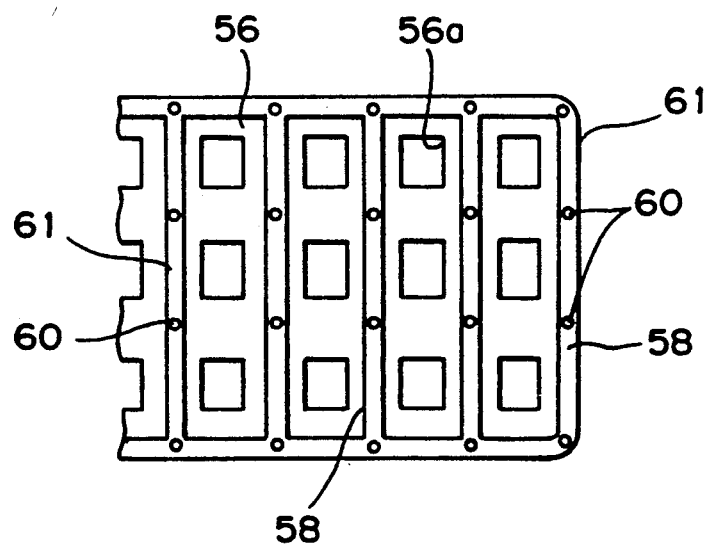
FIG. 8 is a rear view of a switch panel in the embodiment illustrated in FIG. 6.

The reference numeral 56 denotes a switch panel formed of a transparent resin. On the surface of the switch panel 56 is formed an ink coating 62 by an in-mold method except a portion 57 corresponding to the LCD 48 mounted on the flexible printed circuit board 44. The switch panel 56 is formed with a plurality of holes 56a for insertion therein of convex key tops 54 of the key top sheet 52 and also is formed with a plurality of partition walls 58 so as to partition the holes 56a into groups each consisting of three transversely holes as best shown in FIG. 8. On the partition walls 58 there are provided a plurality of projections 60 in a corresponding relation to the holes 40a of the case 40, and a vapor-deposited aluminum film 61 is formed (see FIG. 8) on end faces of the wall portion which defines the circumference of the switch panel 56 and, also on end faces of the partition walls 58 and side faces of the projections 60 as shown in FIG. 7.

Figure 9:
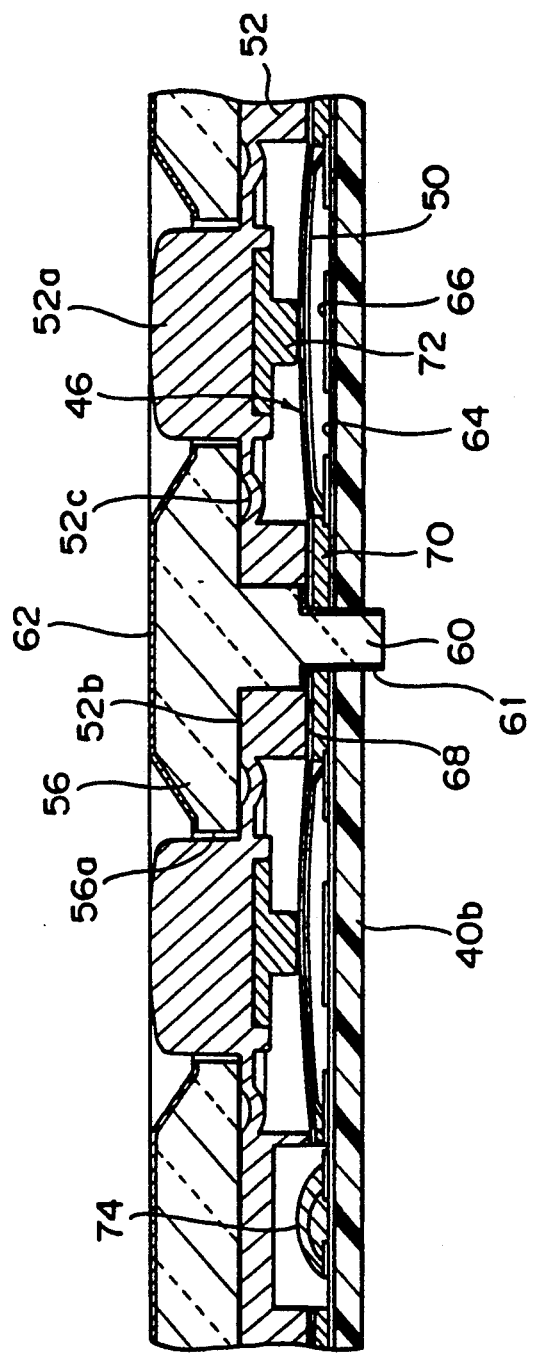
FIG. 9 is an enlarged sectional view of a switch portion in the embodiment illustrated in FIG. 6.

A detailed structure of the switch portion in this embodiment will now be described with reference to FIG. 9. A polyester film 64 is bonded onto the support base 40b of the case, and metallic contacts 66 are provided in positions corresponding to the switch disks 50. Another polyester film 68 covers the switch disk 50 from above, and a spacer 70 is provided between adjacent switch disks 50. In this way a membrane switch 46 is constituted.

The key top sheet 52 is formed by connecting the convex key tops 52a and contact support portions 52b through skirt portions 52c. The convex key tops 52a are inserted into the holes 56a of the switch panel 56 formed of a transparent resin. On the upper surface of the switch panel 56 is formed the ink coating 62 by an in-mold method for example, as set forth above. An actuator 72 is fixed to the lower end of each convex key top 52a of the key top sheet 52, and a bottom end thereof is in abutment with the associated switch disk 50. Further, a plurality of LED's 74 for illumination are mounted on the membrane switch 46.

Upon depression of a convex key top 52a, the associated skirt portion 52c bend and the actuator 72 pushes down the switch disk 50, so that the switch disk 50 comes into abutment with the contact 66 and the switch turns on. When the pushing force for the convex key top 52a is released, the switch disk 50 reverts to its original state by virtue of its resilient force, so that the switch turns off.

Also in the telephone set housing of this embodiment, like the previous embodiment, when the LED's 74 for illumination are turned on, the switch panel 56 formed of a transparent resin functions as a light guide plate and it is possible to illuminate the convex key tops 52a, whereby the switching operation can be effected easily even during the night.

The switch portion in this embodiment is assembled in the following manner. First, the holes 46a formed in the flexible printed circuit board 44 are aligned with the holes 40a of the case 40, and the flexible printed circuit board 44 is bonded to the support base 40b of the case 40. Then, the key top sheet 52 is mounted onto the flexible printed circuit board 44, thereafter the projections 60 of the switch panel 56 are inserted into the holes 40a of the case 40 through the holes 52a and 46a of the key top sheet 52 and the flexible printed circuit board 44, respectively, and the switch panel 56 is bonded to the case 40 by ultrasonic welding.

Once the switch portion is assembled in this way, the vapor-deposited aluminum film 61 on the switch panel 56 is connected to the vapor-deposited aluminum film 42 formed on the inner surface of the case 40 through the holes 40a of the case, whereby the switch portion can be shielded electromagnetically. Plates aluminum films may be substituted for the vapor-deposited aluminum films 42 and 61.

What is claimed is:

1. A portable telephone set housing comprising:
   a casing having a support base;
   a first flexible printed circuit board mounted on said support base of the case and having a membrane switch portion and a display portion;
   a key top sheet placed on said flexible printed circuit board and having a plurality of key tops;
   a switch panel mounted on said top sheet and having a plurality of holes for insertion therein of said key tops, said switch panel comprising a transparent resin plate having an ink coating formed on the entire surface thereof except for a portion of the surface corresponding to the position of said display portion, said switch panel being adapted to function as a light guide plate; and
   a plurality of light sources adapted to introduce light into the interior of said switch panel.

2. A portable telephone set housing according to claim 1, wherein said light sources are provided on said membrane switch portion of said flexible printed circuit board.

3. A portable telephone set housing according to claim 1, further including a second printed circuit board disposed within said case, and wherein said light sources are provided on said second printed circuit board.

4. A portable telephone set housing according to claim 1, further including a plurality of switch disks provided in said membrane switch portion of said flexible printed circuit board and a plurality of actuator means fixed to lower ends of said key tops of said key top sheet, said actuator means having bottom ends which contact said switch disks.

5. A portable telephone set housing comprising:
   a casing including a support base having a plurality of holes, with a metallic film being formed on an inner surface of said case;
   a flexible printed circuit board mounted on said support base of the case and having a membrane portion and a display portion, said flexible printed circuit board further having a plurality of holes in positions corresponding to positions of the holes of the case;

a key top sheet placed on said flexible printed circuit board and having a plurality of key tops, said key top sheet having a plurality of holes in positions corresponding to positions of the holes of the case; and a switch panel including a plurality of openings for insertion therein of said key tops, a plurality of partition walls for partitioning said openings by groups, a plurality of projections formed respectively on said partition walls in positions corresponding to positions of the holes of the case, and a metallic film formed on end faces of said partition walls and said faces of said projections, said switch panel being mounted to said case with said projections inserted into the holes of the case through the holes formed in the key top sheet and the holes formed in said flexible printed circuit board.

6. A portable telephone set housing according to claim 5, further including a plurality of light sources adapted to introduce light into the interior of said switch panel and provided on said membrane switch portion of said flexible printed circuit board, and wherein said switch panel is comprised of a transparent resin plate having an ink coating formed on the entire surface thereof except for a portion corresponding to the position of said display portion, said switch panel being adapted to function as a light guide plate.

7. A portable telephone set housing according to claim 5, further including a plurality of switch disks provided on said membrane switch portion of said flexible printed circuit board and a plurality of actuator means fixed to lower ends of said key tops of said key top sheet, said actuator means having bottom ends which contact said switch disks.

* * * * *

UNITED STATES PATENT AND TRADEMARK OFFICE
CERTIFICATE OF CORRECTION

PATENT NO. : 5,235,636
DATED : August 10, 1993
INVENTOR(S) : HISAMITSU TAKAGI, MASASHI TOMURA It is certified that error appears in the above-identified patent and that said Letters Patent is hereby corrected as shown below:

```
Column 1, line 11, "housing" should be --housings--.
Column 2, line 47, "position" should be --positions--.
Column 3, line 54, "constitutes" should be --constitute--.
Column 5, line 15, after "key" insert --top--;
          line 18, delete "relation";
          line 29, after "transversely" insert --aligned--;
          line 35, "56 and," should be --56, and--;

line 60, "portion" should be --portions--.
```

Signed and Sealed this

Twenty-ninth Day of March, 1994

Attest:

BRUCE LEHMAN

*Attesting Officer*  *Commissioner of Patents and Trademarks*